United States Patent
Kobayashi

(10) Patent No.: US 11,273,604 B2
(45) Date of Patent: Mar. 15, 2022

(54) PLASTICIZING APPARATUS AND THREE-DIMENSIONAL MODELING APPARATUS

(71) Applicant: SEIKO EPSON CORPORATION, Tokyo (JP)

(72) Inventor: Hiroki Kobayashi, Hara-mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 147 days.

(21) Appl. No.: 16/831,506

(22) Filed: Mar. 26, 2020

(65) Prior Publication Data
US 2020/0307091 A1    Oct. 1, 2020

(30) Foreign Application Priority Data

Mar. 27, 2019 (JP) .............................. JP2019-059545

(51) Int. Cl.
| | |
|---|---|
| *B29C 64/314* | (2017.01) |
| *B33Y 30/00* | (2015.01) |
| *B29C 64/393* | (2017.01) |
| *B33Y 40/10* | (2020.01) |
| *B33Y 50/02* | (2015.01) |

(52) U.S. Cl.
CPC .......... *B29C 64/314* (2017.08); *B29C 64/393* (2017.08); *B33Y 30/00* (2014.12); *B33Y 40/10* (2020.01); *B33Y 50/02* (2014.12)

(58) Field of Classification Search
CPC .................................................. B29C 64/118
See application file for complete search history.

(56) References Cited

U.S. PATENT DOCUMENTS

| | | |
|---|---|---|
| 3,355,764 A | 12/1967 | Moyer |
| 6,077,062 A | 6/2000 | Guillemette et al. |
| 6,187,237 B1 | 2/2001 | Kirjavainen et al. |
| 6,217,206 B1 | 4/2001 | Kirjavainen et al. |
| 10,800,083 B2 | 10/2020 | Zhu |
| 2007/0082079 A1 | 4/2007 | Peavey et al. |
| 2009/0096129 A1 | 4/2009 | Hirota et al. |
| 2010/0316754 A1 | 12/2010 | Lupke et al. |

(Continued)

FOREIGN PATENT DOCUMENTS

| | | |
|---|---|---|
| JP | H03153311 A | 7/1991 |
| JP | H05138756 A | 6/1993 |

(Continued)

*Primary Examiner* — Yung-Sheng M Tsui
*Assistant Examiner* — Melody Tsui
(74) *Attorney, Agent, or Firm* — Chip Law Group

(57) ABSTRACT

A plasticizing apparatus includes a barrel that is provided with a first through-hole along a first axis, a first screw in which a first groove portion having a spiral shape about a first axis is provided in a surface facing a barrel, a side wall having a cylindrical shape is provided along an outer peripheral edge of a surface facing a side opposite to the barrel, and a second through-hole is provided along the first axis, a second screw of which at least a part is disposed inside the side wall and a second groove portion having a spiral shape about the first axis is provided in a surface facing the barrel with the first screw interposed therebetween, and a drive unit that rotates the first screw and the second screw about the first axis by making angular velocity vectors thereof different from each other with respect to the barrel.

11 Claims, 9 Drawing Sheets

(56) References Cited

U.S. PATENT DOCUMENTS

| | | |
|---|---|---|
| 2018/0311894 A1 | 11/2018 | Saito et al. |
| 2018/0326658 A1 | 11/2018 | Saito et al. |
| 2019/0061243 A1 | 2/2019 | Saito et al. |
| 2019/0160746 A1 | 5/2019 | Anegawa et al. |
| 2019/0248069 A1 | 8/2019 | Anegawa et al. |
| 2019/0255762 A1 | 8/2019 | Mizukami et al. |
| 2019/0255772 A1 | 8/2019 | Mizukami et al. |
| 2019/0283321 A1 | 9/2019 | Mizukami et al. |
| 2019/0358903 A1 | 11/2019 | Watanabe et al. |
| 2020/0016832 A1 | 1/2020 | Yuwaki et al. |
| 2020/0016833 A1 | 1/2020 | Yuwaki et al. |
| 2020/0016834 A1 | 1/2020 | Yuwaki et al. |
| 2020/0031037 A1 | 1/2020 | Hideshima |
| 2020/0061914 A1 | 2/2020 | Onishi |
| 2020/0094476 A1 | 3/2020 | Yamasaki et al. |
| 2020/0101661 A1 | 4/2020 | Sasagawa et al. |
| 2020/0101672 A1 | 4/2020 | Watanabe et al. |
| 2020/0114582 A1 | 4/2020 | Hideshima |
| 2020/0122407 A1 | 4/2020 | Yamazaki |
| 2020/0139629 A1 | 5/2020 | Yokota |
| 2020/0164589 A1 | 5/2020 | Yuwaki et al. |
| 2020/0171744 A1* | 6/2020 | Stubenruss ............ B33Y 10/00 |
| 2020/0171745 A1 | 6/2020 | Yuwaki et al. |
| 2020/0207016 A1 | 7/2020 | Anegawa et al. |
| 2020/0207017 A1 | 7/2020 | Yuwaki et al. |
| 2020/0238611 A1 | 7/2020 | Watanabe |
| 2020/0238612 A1 | 7/2020 | Watanabe |
| 2020/0269502 A1 | 8/2020 | Anegawa et al. |
| 2020/0269515 A1 | 8/2020 | Takahashi |
| 2020/0307082 A1 | 10/2020 | Yuwaki et al. |
| 2020/0307091 A1 | 10/2020 | Kobayashi |
| 2020/0307093 A1 | 10/2020 | Yuwaki et al. |

FOREIGN PATENT DOCUMENTS

| | | | | |
|---|---|---|---|---|
| JP | 2006-247917 A | | 9/2006 | |
| JP | 2007245503 A | | 9/2007 | |
| JP | 2009137260 A | * | 6/2009 | ........... B29C 45/464 |
| JP | 2009137260 A | | 6/2009 | |
| JP | 2009269182 A | | 11/2009 | |
| JP | 2009269183 A | | 11/2009 | |
| JP | 2009285879 A | | 12/2009 | |
| JP | 2010000752 A | | 1/2010 | |
| JP | 2010052264 A | | 3/2010 | |
| JP | 2010208051 A | | 9/2010 | |
| JP | 2010214839 A | | 9/2010 | |
| JP | 2010241016 A | | 10/2010 | |
| JP | 2011020378 A | | 2/2011 | |
| JP | 5088818 B2 | | 12/2012 | |
| JP | 2014237300 A | | 12/2014 | |
| JP | 2015-101053 A | | 6/2015 | |
| JP | 2017-023981 A | | 2/2017 | |
| JP | 2018-187777 A | | 11/2018 | |
| WO | 2007119533 A1 | | 10/2007 | |

\* cited by examiner

PLASTICIZING APPARATUS AND THREE-DIMENSIONAL MODELING APPARATUS

The present application is based on, and claims priority from JP Application Serial Number 2019-059545, filed Mar. 27, 2019, the disclosure of which is hereby incorporated by reference herein in its entirety.

BACKGROUND

1. Technical Field

The present disclosure relates to a plasticizing apparatus and a three-dimensional modeling apparatus.

2. Related Art

For example, JP-A-2018-187777 describes a three-dimensional modeling apparatus including a plurality of units, which plasticize a material into a molten material, in the horizontal direction.

For example, when a composite material combining different kinds of materials is ejected from a nozzle, it is necessary to plasticize each material at once. As in the apparatus described above, if a plurality of units are provided in the horizontal direction and different kinds of materials are plasticized at once, the apparatus becomes large.

SUMMARY

According to an aspect of the present disclosure, a plasticizing apparatus that plasticizes a material into a molten material is provided. The plasticizing apparatus includes a barrel that is provided with a first through-hole along a first axis, a first screw in which a first groove portion having a spiral shape about a first axis is provided in a surface facing a barrel, a side wall having a cylindrical shape is provided along an outer peripheral edge of a surface facing a side opposite to the barrel, and a second through-hole is provided along the first axis, a second screw of which at least a part is disposed inside the side wall and in which a second groove portion having a spiral shape about the first axis is provided in a surface facing the barrel with the first screw interposed therebetween, and a drive unit that rotates the first screw and the second screw about the first axis by making angular velocity vectors thereof different from each other with respect to the barrel. The first screw generates first molten material by plasticizing a first material supplied to the first groove portion by a relative rotation with the barrel and sends out the first molten material from the first through-hole, and the second screw generates a second molten material by plasticizing a second material supplied to the second groove portion by a relative rotation with the first screw and sends out the second molten material to the second through-hole.

DESCRIPTION OF EXEMPLARY EMBODIMENTS

A. First Embodiment

Figure 1:
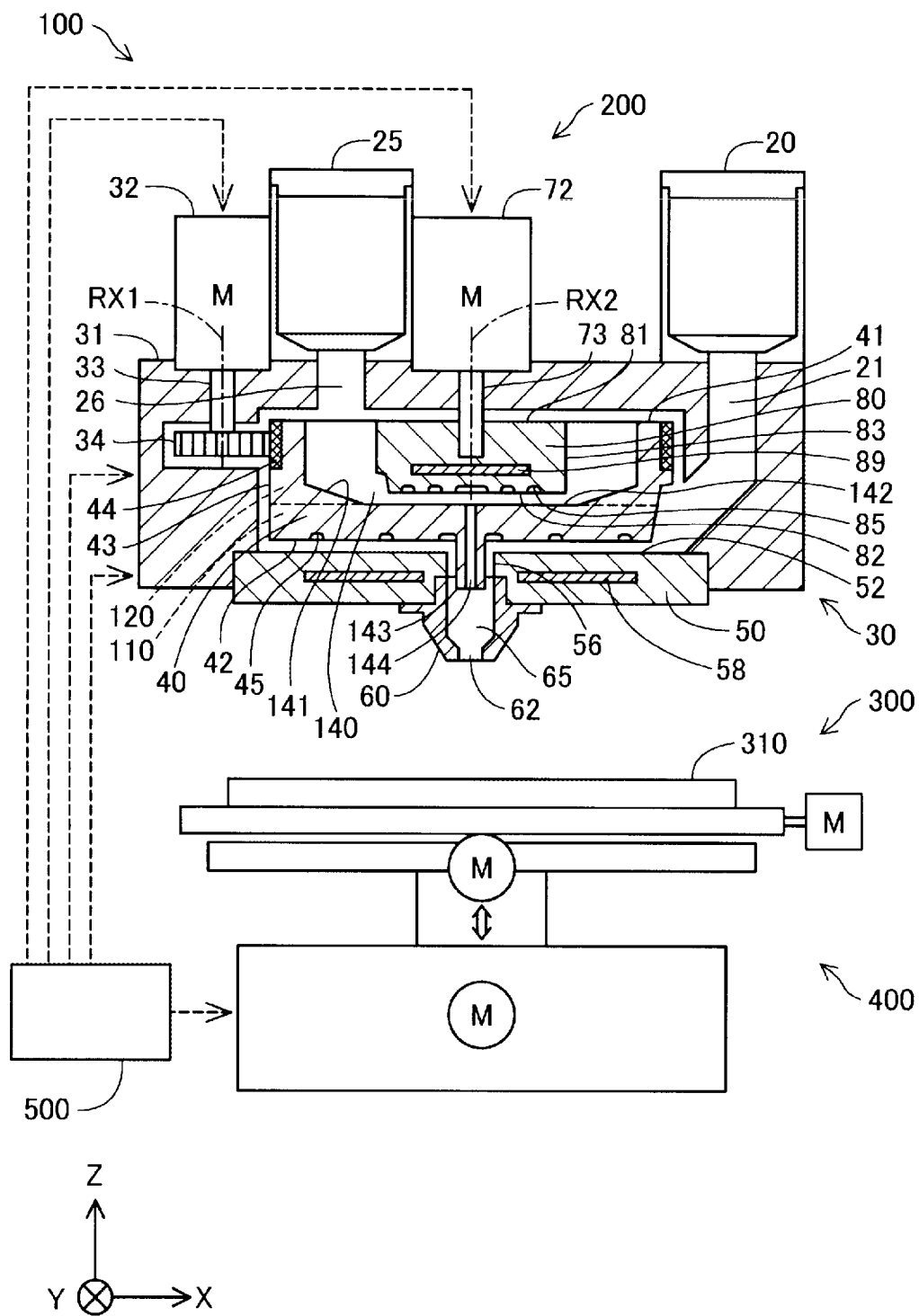
FIG. 1 is an explanatory diagram illustrating a schematic configuration of a three-dimensional modeling apparatus according to a first embodiment.

FIG. 1 is an explanatory diagram illustrating a schematic configuration of a three-dimensional modeling apparatus 100 according to a first embodiment. FIG. 1 illustrates arrows along X, Y, and Z directions orthogonal to each other. The X direction and the Y direction are directions along a horizontal direction, and the Z direction is a direction along a vertical direction. In other figures, the arrows along the X, Y, and Z directions are appropriately represented. The X, Y, and Z directions in FIG. 1 and the X, Y, and Z directions in other figures represent the same direction.

The three-dimensional modeling apparatus 100 according to the present embodiment includes a modeling unit 200, a stage 300, a movement mechanism 400, and a control unit 500. The three-dimensional modeling apparatus 100 drives the movement mechanism 400 while ejecting a molten material from a nozzle 60 provided in the modeling unit 200 toward the modeling surface 310 of the stage 300 under a control of the control unit 500, and changes a relative position between the nozzle 60 and the modeling surface 310, thereby, modeling a three-dimensional model having a desirable shape on the modeling surface 310. The molten material may be referred to as a modeling material.

The movement mechanism 400 changes the relative position between the nozzle 60 and the modeling surface 310. In the present embodiment, the movement mechanism 400 changes the relative position between the nozzle 60 and the modeling surface 310 by moving the stage 300 for the modeling unit 200. The movement mechanism 400 according to the present embodiment is configured by a three-axis positioner that moves the stage 300 in the three-axis directions of the X, Y, and Z directions by using drive forces of three motors. Each motor is driven under the control of the control unit 500. The movement mechanism 400 is not configured to move the stage 300 but is configured to change the relative position between the nozzle 60 and the modeling surface 310 by moving the modeling unit 200 without moving the stage 300. Further, the movement mechanism 400 may be configured to change the relative position between the nozzle 60 and the modeling surface 310 by moving both the stage 300 and the modeling unit 200.

The control unit 500 is configured by a computer including one or more processors, a main storage apparatus, and an input/output interface for inputting and outputting signals to and from the outside. In the present embodiment, as by the processor executes a program and commands read on the main storage apparatus, the control unit 500 controls operations of the modeling unit 200 and the movement mechanism 400 to perform modeling processing for modeling a three-dimensional model. The operation includes movement of a three-dimensional relative position between the modeling unit 200 and the stage 300. The control unit 500 may be configured by a combination of a plurality of circuits instead of the computer.

The modeling unit 200 includes a first material supply portion 20 that is a supply source of the first material, a second material supply portion 25 that is a supply source of a second material, a plasticizing portion 30 that plasticizes the first material supplied from the first material supply portion 20 into a first molten material and plasticizes the second material supplied from the second material supply portion 25 into a second molten material, and the nozzle 60 that ejects the first molten material and the second molten material which are supplied from the plasticizing portion 30 toward the modeling surface 310. The "plasticization" means that a material having thermoplasticity is heated and melted. The "melting" also means that the material having thermoplasticity is softened by being heated to a temperature higher than or equal to a glass transition point and fluidity is exhibited. The first material and the second material may be simply referred to as materials without a particular distinction. The first molten material and the second molten material may be simply referred to as molten materials without a particular distinction. The plasticizing portion 30 may be referred to as a plasticizing apparatus.

The first material supply portion 20 contains a first material in a state of pellets, powder, or the like. In the present embodiment, an ABS resin, which is a thermoplastic resin formed in a pellet shape, is used as the first material. The first material supply portion 20 according to the present embodiment is configured by a hopper. A first supply path 21 that connects between the first material supply portion 20 and the plasticizing portion 30 is provided below the first material supply portion 20. The first material supply portion 20 supplies a first material to the plasticizing portion 30 via the first supply path 21.

The second material supply portion 25 contains a second material in a state of pellets, powder, or the like. Since the first material supply portion 20 and the second material supply portion 25 are provided separately, the second material supply portion 25 can contain a second material different from the first material contained in the first material supply portion 20. In the present embodiment, polypropylene resin (PP), which is a thermoplastic resin formed in a pellet shape, is used as the second material. The second material supply portion 25 according to the present embodiment is configured by the hopper. A second supply path 26 that connects between the second material supply portion 25 and the plasticizing portion 30 is provided below the second material supply portion 25. The second material supply portion 25 supplies the second material to the plasticizing portion 30 via the second supply path 26.

The plasticizing portion 30 includes a screw case 31, a first drive motor 32, a first flat screw 40, a second drive motor 72, a second flat screw 80, and a barrel 50. The plasticizing portion 30 supplies the nozzle 60 with the first molten material in a paste form by melting at least a part of the first material in a solid state supplied from the first material supply portion 20, and supplies the nozzle 60 with the second molten material in a paste form by melting at least a part of the second material in a solid state supplied from the second material supply portion 25. The first flat screw 40 may be called a first screw, and the second flat screw 80 may be called a second screw. The first drive motor 32, the second drive motor 72, and gear 34 and first teeth portion 44 which will be described below may be referred to as a drive unit.

The screw case 31 is a housing that houses the first flat screw 40 and the second flat screw 80. The barrel 50 is fixed to a lower surface of the screw case 31, and the first flat screw 40 and the second flat screw 80 are contained in a space surrounded by the screw case 31 and the barrel 50.

The first drive motor 32 is fixed outside the second material supply portion 25 over an upper surface of the screw case 31. The first drive motor 32 includes a first shaft 33 that rotates about a rotation axis RX1 parallel to the Z direction. The gear 34 is fixed to a front end of the first shaft 33. Rotation of the first drive motor 32 is controlled by the control unit 500.

The second drive motor 72 is fixed to the center of the upper surface of the screw case 31. The second drive motor 72 includes a second shaft 73 that rotates about a rotation axis RX2 parallel to the Z direction. Rotation of the second drive motor 72 is controlled by the control unit 500.

The first flat screw 40 includes a disc-shaped base portion 110 and a cylindrical side wall portion 120 provided along an outer peripheral edge of the base portion 110. In FIG. 1, a boundary line between the base portion 110 and the side wall portion 120 is indicated by a dashed line. In the present embodiment, the base portion 110 and the side wall portion 120 are provided integrally. A diameter of the base portion 110 is equal to a diameter of the side wall portion 120. A central axis of the base portion 110 and a central axis of the side wall portion 120 coincide with each other, and these central axes are referred to as a central axis of the first flat screw 40. A combined height of the base portion 110 and the side wall portion 120 in a direction along the central axis of the first flat screw 40 is smaller than the diameter of the base portion 110 and the diameter of the side wall portion 120. The first flat screw 40 is disposed in the screw case 31 such that a central axis thereof may follow the rotation shaft RX2. The first flat screw 40 may be supported by the screw case 31 via a bearing or the like (not illustrated). For example, the first flat screw 40 may support an outer peripheral edge of a lower surface of the base portion 110 or may support an outer peripheral surface 43 of the first flat screw 40 such that supplying the first material from the first material supply portion 20 is not hindered. The outer peripheral surface 43 of the first flat screw 40 means a region including an outer peripheral surface of the base portion 110 and an outer peripheral surface of the side wall portion 120.

The first flat screw 40 includes the first teeth portion 44 on the outer peripheral surface 43. The first teeth portion 44 is a portion where a plurality of teeth are provided along a peripheral direction of the first flat screw 40. In the present embodiment, the first teeth portion 44 is provided on the outer peripheral surface of the side wall portion 120. The first teeth portion 44 may be provided on the outer peripheral surface of the base portion 110. The first teeth portion 44 meshes with a gear 34 provided at a front end of the first shaft 33 of the first drive motor 32. Torque generated by the first drive motor 32 is transferred to the first flat screw 40 via the gear 34. The first flat screw 40 rotates about the rotation axis RX2 in the screw case 31 by the torque generated by the first drive motor 32.

The first flat screw 40 includes a first groove forming surface 42 on a lower surface of the base portion 110. The first groove forming surface 42 is provided with a first groove portion 45 that extends in a spiral shape toward an outer circumference about the rotation axis RX2. The detailed configuration of the first groove portion 45 will be described below with reference to FIG. 4.

The first flat screw 40 include a recessed portion 140 that contains the second flat screw 80. The recessed portion 140 is a portion configured by an upper surface of the base portion 110 and an inner peripheral surface of the side wall portion 120. The recessed portion 140 contains at least apart of the second flat screw 80. In the present embodiment, the second flat screw 80 is contained in the recessed portion 140 such that an upper surface 41 of the first flat screw 40 and an upper surface 81 of the second flat screw 80 are at the same height. The second flat screw 80 may be contained in the recessed portion 140 such that the upper surface 81 of the second flat screw 80 is located below the upper surface 41 of the first flat screw 40, or the second flat screw 80 may be contained in the recessed portion 140 such that the upper surface 81 of the second flat screw 80 is located above the upper surface 41 of the first flat screw 40.

The first flat screw 40 includes a second facing surface 142 that faces the second groove forming surface 82 of the second flat screw 80 which will be described below, on an upper surface of the base portion 110, in other words, on a surface opposite to the first groove forming surface 42. A material receiving portion 141 for causing the recessed portion 140 to receive the second material supplied from the second material supply portion 25 is provided in an inner peripheral portion of the side wall portion 120.

The first flat screw 40 includes a protruding portion 143 extending along the rotation axis RX2 from the first groove forming surface 42 to an inside of a first through-hole 56 of the barrel 50 which will be described below. A second through-hole 144 is provided in the second facing surface 142 along the rotation axis RX2.

The second flat screw 80 has a cylindrical shape whose height in a direction along a central axis is smaller than a diameter thereof. The second flat screw 80 is disposed in the screw case 31 such that the central axis is along the rotation axis RX2.

The second shaft 73 of the second drive motor 72 is coupled to the upper surface 81 of the second flat screw 80. The second flat screw 80 rotates about the rotation axis RX2 in the screw case 31 by the torque generated by the second drive motor 72.

The second flat screw 80 includes the second groove forming surface 82 on a side opposite to the upper surface 81 in the direction along the rotation axis RX2. The second groove forming surface 82 faces the barrel 50 with the first flat screw 40 interposed therebetween. The second groove forming surface 82 is provided with a second groove portion 85 extending in a spiral shape toward an outer circumference about the rotation axis RX2. The detailed configuration of the second groove portion 85 will be described below with reference to FIG. 5.

A screw heater 89 is built in the second flat screw 80. The screw heater 89 is located above the second groove portion 85. A temperature of the screw heater 89 is controlled by the control unit 500. The screw heater 89 may be referred to as a second heating unit.

The barrel 50 is fixed below the first flat screw 40. The barrel 50 includes a first facing surface 52 that faces the first groove forming surface 42 of the first flat screw 40. The first facing surface 52 is provided with the first through-hole 56 along the rotation axis RX2. The detailed configuration of the first facing surface 52 of the barrel 50 will be described below with reference to FIG. 6.

A barrel heater 58 is built in the barrel 50. The barrel heater 58 is located below the first groove portion 45 of the first flat screw 40. A temperature of the barrel heater 58 is controlled by the control unit 500. The barrel heater 58 may be referred to as a first heating unit.

The nozzle 60 is provided on a lower surface of the barrel 50. A nozzle flow path 65 is provided inside the nozzle 60. A nozzle flow path 65 communicates with the first through-hole 56 and the second through-hole 144. The nozzle 60 is provided with a nozzle hole 62 at a front end portion facing the modeling surface 310 of the stage 300. The nozzle hole 62 communicates with the nozzle flow path 65. The nozzle 60 ejects the first molten material sent out from the first through-hole 56 and the second molten material sent out from the second through-hole 144 toward the modeling surface 310 from the nozzle hole 62. In the present embodiment, the nozzle 60 is provided with the nozzle hole 62 having a circular shape. The nozzle 60 may be provided with the nozzle hole 62 having a square shape or the like instead having the circular shape.

Figure 2:
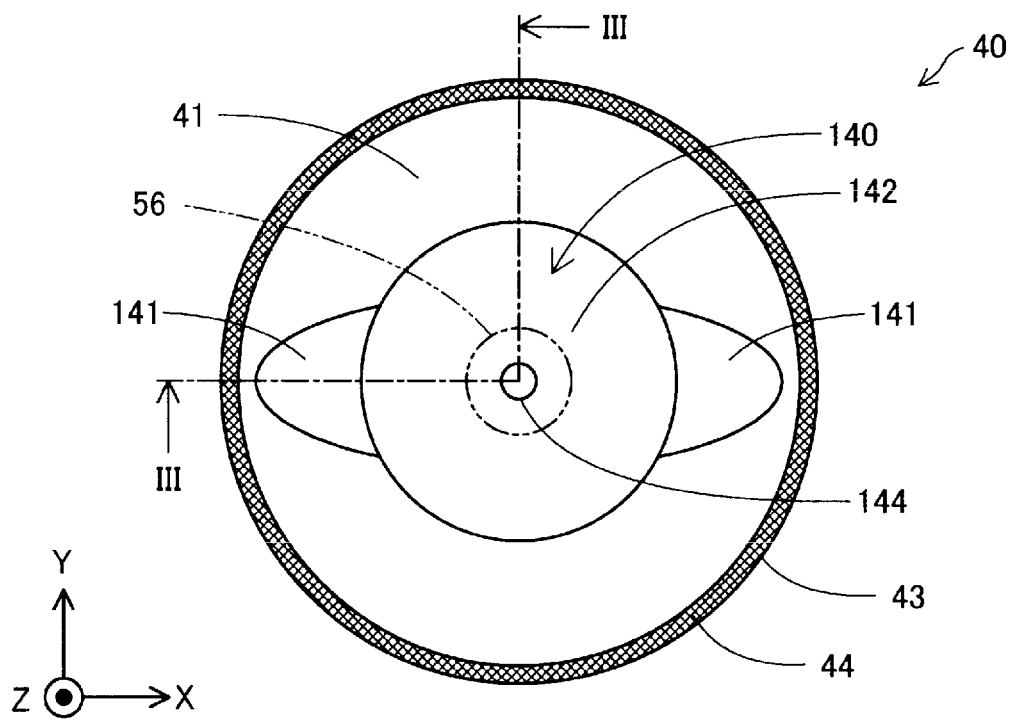
FIG. 2 is a top view of a first flat screw according to the first embodiment.
Figure 3:
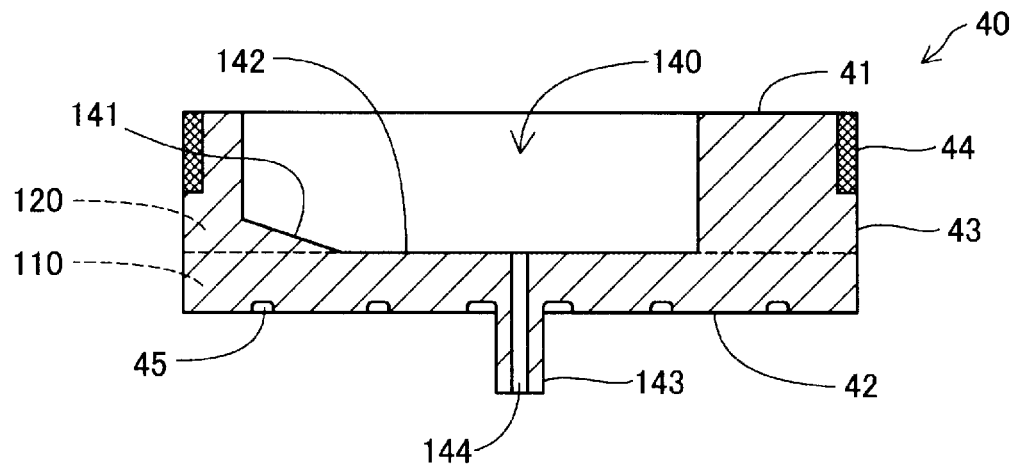
FIG. 3 is a cross sectional view taken along line III-III of the first flat screw according to the first embodiment.

FIG. 2 is a top view of the first flat screw 40 according to the present embodiment. FIG. 3 is a cross-sectional view, which is taken along line of the first flat screw 40 of FIG. 2. In FIG. 2, for reference, an opening of the first through-hole 56 in the first facing surface 52 of the barrel 50 is indicated by a two-dot chain line. As described above, the first flat screw 40 includes the first teeth portion 44, the recessed portion 140, the second facing surface 142, the material receiving portion 141, and the second through-hole 144.

The first teeth portion 44 is provided over the entire circumference of the outer peripheral surface 43 of the first flat screw 40. In the first teeth portion 44, a plurality of teeth are arranged at equal intervals along a peripheral direction of the first flat screw 40. As described above, since the gear 34 provided on the first shaft 33 of the first drive motor 32 meshes with the first teeth portion 44, the first flat screw 40 rotates according to the rotation of the gear 34.

The recessed portion 140 is provided in the inner peripheral portion of the first flat screw 40. As described above, the recessed portion 140 includes the second flat screw 80 having a cylindrical shape. The second facing surface 142 is provided at a bottom of the recessed portion 140. The second facing surface 142 is provided perpendicularly to a central axis of the first flat screw 40.

The material receiving portion 141 is provided in the inner peripheral portion of the side wall portion 120. The material receiving portion 141 is a recess for receiving the second material supplied from the second supply path 26 in the recessed portion 140. In the present embodiment, two material receiving portions 141 are provided with the second facing surface 142 interposed therebetween. A surface of the material receiving portion 141 is inclined with respect to the second facing surface 142 such that the second material supplied from the second supply path 26 easily faces the second groove portion 85.

The second through-hole 144 is provided along the central axis of the first flat screw 40. The second through-hole 144 penetrates between the second facing surface 142 and a front end of the protruding portion 143. An opening of the second through-hole 144 at the front end of the protruding portion 143 is smaller than an opening of the first through-hole 56 in the first facing surface 52. Accordingly, as illustrated in FIG. 2, when the first flat screw 40 and the barrel 50 are viewed along the central axis of the first flat screw 40, the opening of the second through-hole 144 provided in the front end of the protruding portion 143 is located inside the opening of the first through-hole 56 provided in the first facing surface 52.

Figure 4:
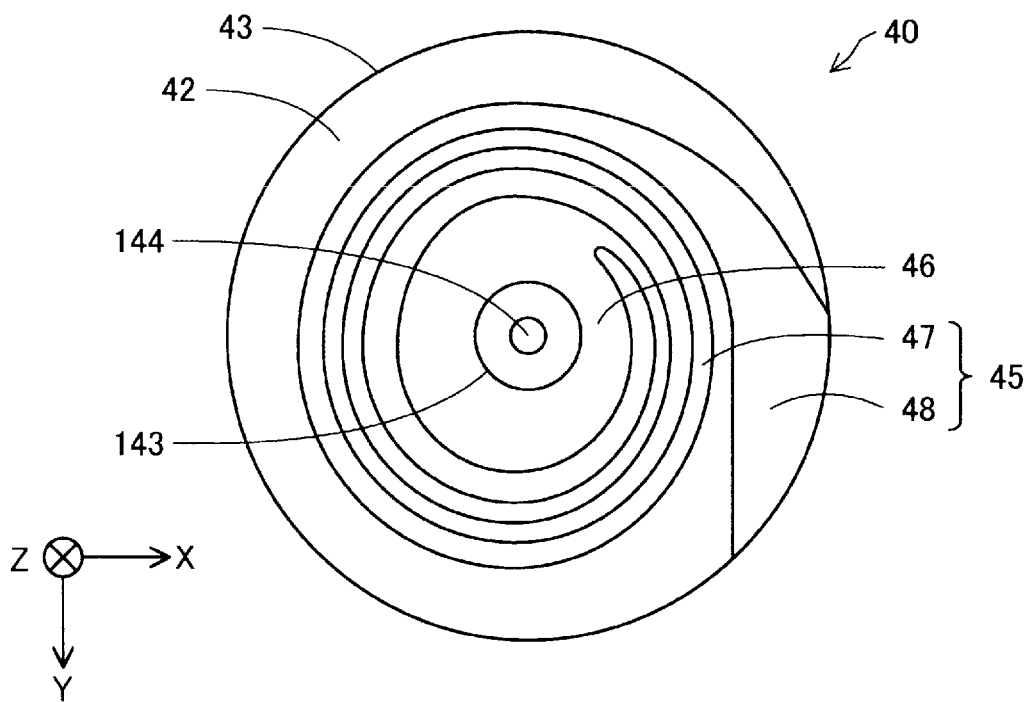
FIG. 4 is a bottom view of the first flat screw according to the first embodiment.

FIG. 4 is a bottom view of the first flat screw 40 according to the present embodiment. As described above, the first flat screw 40 includes the first groove forming surface 42. The first groove forming surface 42 is provided with a first central portion 46 and the first groove portion 45. The first central portion 46 is a circular recess formed around a central axis of the first flat screw 40. The first central portion 46 faces the first through-hole 56 of the barrel 50. The protruding portion 143 extends from the first central portion 46 along the central axis of the first flat screw 40.

The first groove portion 45 includes a first spiral shape portion 47 and a first material introduction portion 48. The first spiral shape portion 47 is a groove extending in a spiral shape so as to draw an arc toward an outer circumference of the first groove forming surface 42 around the central axis of the first flat screw 40. The first spiral shape portion 47 may be configured to extend in an involute curve shape or a spiral shape. One end of the first spiral shape portion 47 is connected to the first central portion 46, and the other end of the first spiral shape portion 47 is connected to the first material introduction portion 48. In the present embodiment, as will be described later, the first flat screw 40 rotates counterclockwise when viewed from above the Z axis. In contrast to this, in another form in which the first flat screw 40 rotates clockwise when viewed from above the Z axis, the first spiral shape portion 47 is provided to spiral in a direction opposite to a spiral direction illustrated in FIG. 4.

The first material introduction portion 48 is a groove wider than the first spiral shape portion 47 provided in an outer peripheral edge of the first groove forming surface 42. The first material introduction portion 48 continues to the outer peripheral surface 43 of the first flat screw 40. The first material introduction portion 48 introduces the first material supplied from the first material supply portion 20 through the first supply path 21 into the first spiral shape portion 47. FIG. 4 illustrates a form in which a single first groove portion 45 is provided from the first central portion 46 of the first flat screw 40 toward an outer circumference, but a plurality of first groove portions 45 may be provided from the first central portion 46 of the first flat screw 40 toward the outer circumference.

Figure 5:
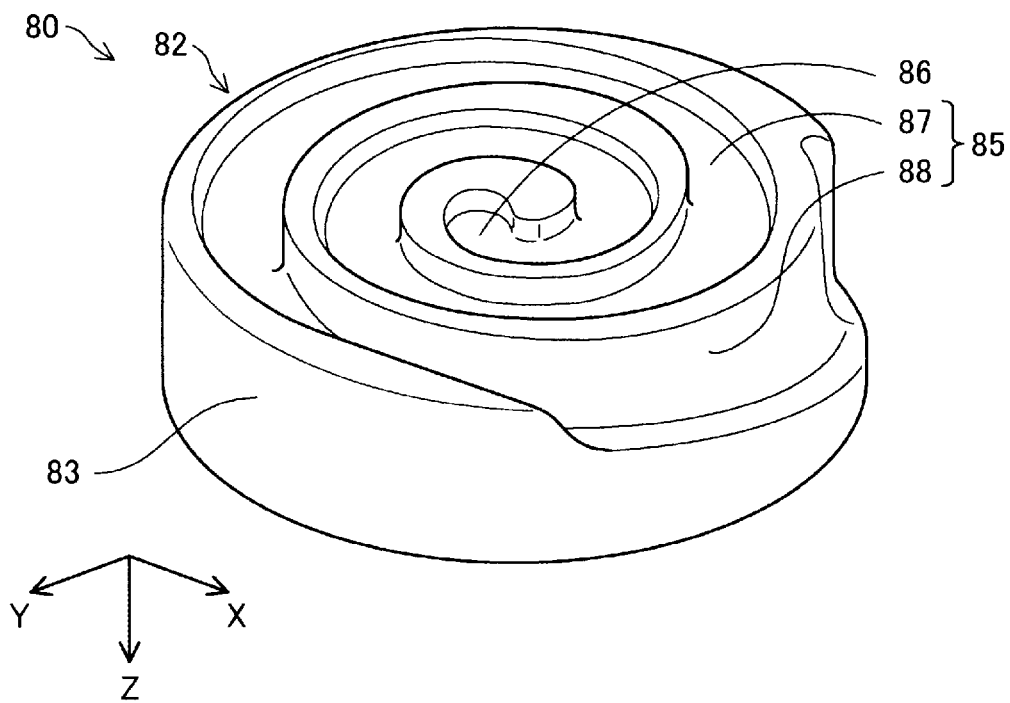
FIG. 5 is a perspective view illustrating a second flat screw according to the first embodiment.

FIG. 5 is a perspective view illustrating a configuration of the second groove forming surface 82 of the second flat screw 80 according to the present embodiment. The second flat screw 80 illustrated in FIG. 5 is illustrated in a state in which a vertical positional relationship illustrated in FIG. 1 is reversed in order to facilitate understanding of a technology. A second central portion 86 and the second groove portion 85 are provided on the second groove forming surface 82 of the second flat screw 80. The second central portion 86 is a circular recess formed around a central axis of the second flat screw 80. The second central portion 86 faces the second through-hole 144 of the first flat screw 40.

The second groove portion 85 includes a second spiral shape portion 87 and a second material introduction portion 88. The second spiral shape portion 87 is a groove extending in a spiral shape so as to draw an arc toward an outer circumference of the second groove forming surface 82 around a central axis of the second flat screw 80. The second spiral shape portion 87 may be configured to extend in an involute curve shape or a spiral shape. One end of the second spiral shape portion 87 is coupled to the second central portion 86, and the other end of the second spiral shape portion 87 is coupled to the second material introduction portion 88. In the present embodiment, as will be described below, the second flat screw 80 rotates clockwise when viewed from above the Z axis. In contrast to this, in another form in which the second flat screw 80 rotates counterclockwise when viewed from above the Z axis, the second spiral shape portion 87 is provided to spiral in a direction opposite to a spiral direction illustrated in FIG. 5.

The second material introduction portion 88 is a groove wider than the second spiral shape portion 87 provided in an outer peripheral edge of the second groove forming surface 82. The second material introduction portion 88 continues to a side surface 83 of the second flat screw 80. The second material introduction portion 88 introduces the second material supplied from the second material supply portion 25 through the second supply path 26 into the second spiral shape portion 87. FIG. 5 illustrates a form in which a single second groove portion 85 is provided from the second central portion 86 of the second flat screw 80 toward an outer circumference, but a plurality of second groove portions 85 may be provided from the second central portion 86 of the second flat screw 80 toward the outer circumference.

Figure 6:
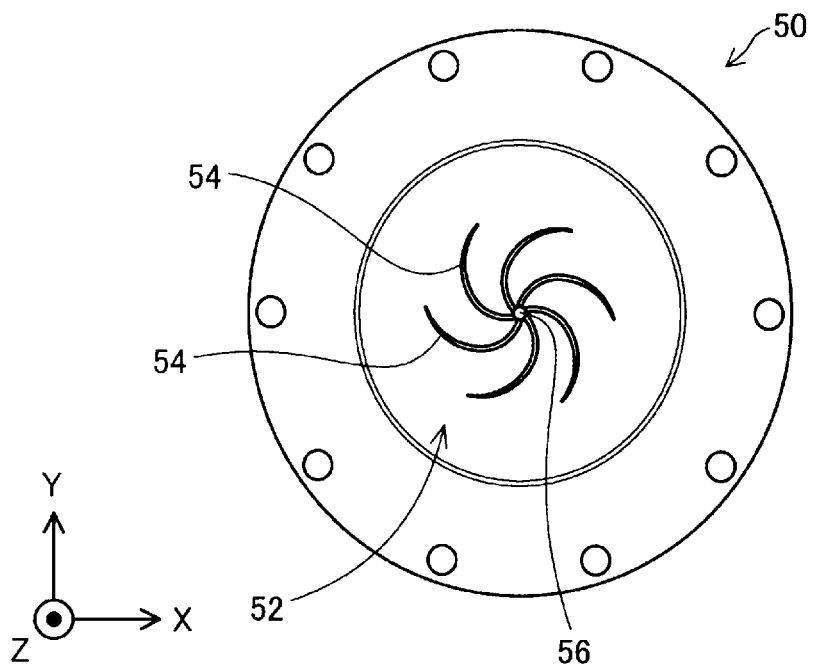
FIG. 6 is a top view illustrating a configuration of a first facing surface of a barrel according to the first embodiment.

FIG. 6 is a top view illustrating a configuration of the first facing surface 52 of the barrel 50 according to the present embodiment. As described above, the first through-hole 56 communicating with the nozzle 60 is provided in the center of the first facing surface 52. A plurality of guide grooves 54 are formed around the first through-hole 56 in the first facing surface 52. One end of each guide groove 54 is coupled to the first through-hole 56 and extends in a spiral shape from the first through-hole 56 toward an outer circumference of the first facing surface 52. Each guide groove 54 has a function of guiding the first molten material to the first through-hole 56. In the present embodiment, as will be described below, the first flat screw 40 rotates counterclockwise when viewed from above the Z axis. In contrast to this, in another form in which the first flat screw 40 rotates clockwise when viewed from above the Z axis, the guide groove 54 is provided so as to spiral in a direction opposite to a spiral direction illustrated in FIG. 6.

Figure 7:
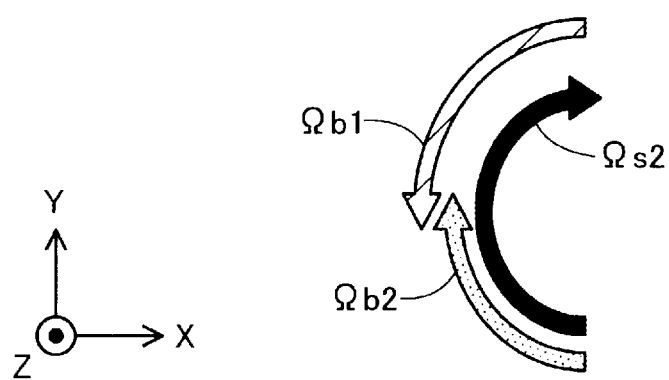
FIG. 7 is an explanatory diagram illustrating an angular velocity vector according to the first embodiment.

FIG. 7 is an explanatory diagram illustrating an angular velocity vector of the first flat screw 40 and an angular velocity vector of the second flat screw 80. FIG. 7 illustrates an angular velocity vector $\Omega b1$ of the first flat screw 40 with respect to the barrel 50, an angular velocity vector $\Omega b2$ of the second flat screw 80 with respect to the barrel 50, and an angular velocity vector $\Omega s2$ of the second flat screw 80 with respect to the first flat screw 40 when the first flat screw 40 and the second flat screw 80 are viewed from above. By controlling the control unit 500, the first drive motor 32, and the second drive motor 72, the angular velocity vector $\Omega b1$ of the first flat screw 40 with respect to the barrel 50 and the angular velocity vector $\Omega b2$ of the second flat screw 80 with respect to the barrel 50 are made different from each other, and the first flat screw 40 and the second flat screw 80 are rotated about the rotation axis RX2. That is, the control unit 500 rotates the first flat screw 40 and the second flat screw 80 by making at least one of a rotation speed and a rotation direction different from each other.

As illustrated in FIG. 7, in the present embodiment, the control unit 500 rotates the first flat screw 40 and the second flat screw 80 in mutually opposite rotation directions. The control unit 500 rotates the first flat screw 40 counterclockwise in FIG. 7 and rotates the second flat screw 80 clockwise in FIG. 7. In the present embodiment, the control unit 500 rotates the first flat screw 40 and the second flat screw 80 at the same rotation speed. The control unit 500 may rotate the first flat screw 40 and the second flat screw 80 at different rotation speeds. Since a rotation direction of the first flat screw 40 and a rotation direction of the second flat screw 80 are opposite to each other, a magnitude of the angular velocity vector Ωs2 of the second flat screw 80 with respect to the first flat screw 40 is larger than a magnitude of the angular velocity vector Ωb2 of the second flat screw 80 with respect to the barrels 50.

The first material is supplied from the first material supply portion 20 between the rotating first flat screw 40 and the barrel 50. The first material is transported from an outer circumference toward the center along the first groove portion 45 by a relative rotation between the first flat screw 40 and the barrel 50. While the first groove portion 45 is transported, at least a part of the first material is melted by heating by the barrel heater 58 and shearing by the relative rotation between the first flat screw 40 and the barrel 50, and becomes the first molten material. The first molten material is transported to the first central portion 46 of the first flat screw 40 and is sent out from the first through-hole 56.

The second material is supplied from the second material supply portion 25 between the rotating second flat screw 80 and the first flat screw 40. The second material is transported from the outer circumference toward the center along the second groove portion 85 by the relative rotation between the second flat screw 80 and the first flat screw 40. While the second groove portion 85 is transported, at least a part of the second material is melted by heating by the screw heater 89 and shearing by the relative rotation between the second flat screw 80 and the first flat screw 40, and become the second molten material. The second molten material is transported to the second central portion 86 of the second flat screw 80 and sent out from the second through-hole 144.

Figure 8:
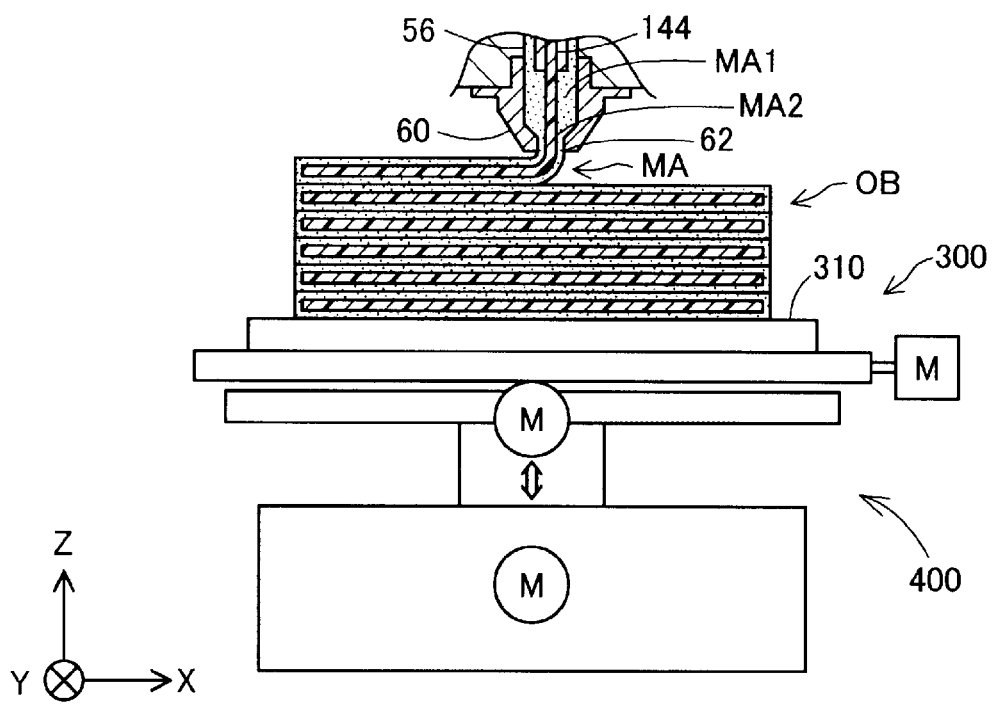
FIG. 8 is an explanatory diagram illustrating a state in which a molten material is ejected from a nozzle.

FIG. 8 is an explanatory diagram illustrating a state in which the molten material MA is ejected from the nozzle 60. In the nozzle 60, an outer peripheral surface of the second molten material MA2 sent out from the second through-hole 144 is covered with the first molten material MA1 sent out from the first through-hole 56. Accordingly, the molten material MA ejected from the nozzle hole 62 has a form in which the first molten material MA1 and the second molten material MA2 overlap each other. The control unit 500 controls the movement mechanism 400 to move the nozzle 60 to the modeling surface 310 of the stage 300 along a preset path, and ejects the molten material MA from the nozzle hole 62 to the modeling surface 310, and thereby, the molten material MA is sacked on the modeling surface 310. By doing so, a three-dimensional model OB having a desirable shape is modeled.

According to the three-dimensional modeling apparatus 100 including the plasticizing portion 30 of the present embodiment described above, the first material can be plasticized by the relative rotation between the first flat screw 40 and the barrel 50, and the second material can be plasticized by relative rotation between the second flat screw 80 contained in the recessed portion 140 of the first flat screw 40 and the first flat screw 40. Accordingly, different types of materials can be plasticized by a small apparatus at once. Particularly, in the present embodiment, since a gear or the like for rotating the first flat screw 40 or the second flat screw 80 is not provided in the recessed portion 140 of the first flat screw 40, it is possible to suppress rotation of the first flat screw 40 from being hindered due to foreign matter caught in the gear or the like.

In the present embodiment, the barrel heater 58 is provided in the barrel 50, and the first material supplied to the first groove portion 45 can be heated by the barrel heater 58. Accordingly, plasticization of the first material in the first groove portion 45 can be promoted.

In the present embodiment, the screw heater 89 is provided to the second flat screw 80, and the second material supplied to the second groove portion 85 can be heated by the screw heater 89. Accordingly, plasticization of the second material in the second groove portion 85 can be promoted.

In the present embodiment, the molten material MA in a form in which an outer peripheral surface of the second molten material MA2 is covered with the first molten material MA1 can be ejected from the nozzle hole 62. Accordingly, characteristics of a portion that is visually recognizable from the outside in the three-dimensional model OB can be made different from internal characteristics. Particularly, in the present embodiment, the portion that is visually recognizable from the outside in the three-dimensional model OB can be formed of ABS resin, and an inside thereof can be formed of polypropylene resin (PP) having a specific gravity lighter than a specific gravity of the ABS resin, the three-dimensional model OB can be reduced in weight without changing an appearance.

In the present embodiment, the protruding portion 143 extends from the first flat screw 40 into the first through-hole 56 of the barrel 50, and the second through-hole 144 is provided to penetrate a portion between the second facing surface 142 and a front end of the protruding portion 143, it is possible to suppress the second material sent out from the second through-hole 144 from flowing between the first flat screw 40 and the barrel 50.

In the present embodiment, although the first material of ABS resin and the second material of the polypropylene resin (PP) are used as materials used in the modeling unit 200, and for example, a material that models a three-dimensional model using various materials such as a thermoplastic material, a metal material, and a ceramic material as a main material may be employed as a material used for the modeling unit 200. Here, the "main material" means a material which is mainly used in forming a shape of the three-dimensional model, and means a material occupying a content of 50% by weight or more in the three-dimensional model. The above-described molten material includes a material obtained by melting the main material alone and includes a material formed in a paste shape by melting partial components contained together with the main material.

When a material having thermoplasticity is used as the main material, a molten material is formed by plasticizing the material in the plasticizing portion 30. As described above, "plasticization" means that a material having thermoplasticity is heated and melted. Further, "melting" also means that a material having thermoplasticity is softened when heated to a temperature higher than or equal to a glass transition point, and fluidity is exhibited.

For example, a thermoplastic resin material in which any one or a combination of two or more of the following can be used as the material having thermoplasticity.

Example of Thermoplastic Resin Material

Polypropylene resin (PP), polyethylene resin (PE), polyacetal resin (POM), polyvinyl chloride resin (PVC), polyamide resin (PA), acrylonitrile/butadiene/styrene resin (ABS), polylactic acid resin (PLA), polyphenylene sulfide resin (PPS), polycarbonate (PC), modified polyphenylene ether, polybutylene terephthalate, general-purpose engineering plastics such as polyethylene terephthalate, polysulfone, polyethersulfone, polyphenylene sulfide, polyarylate, polyimide, polyamideimide, polyetherimide, and engineering plastic such as polyetheretherketone (PEEK)

The thermoplastic material may contain pigment, metal, ceramic, and other additives such as wax, flame retardant, antioxidant, and heat stabilizer. The thermoplastic material is converted into a plasticized and melted state in the plasticizing portion 30 by rotation of the first flat screw 40, heating of the barrel heater 58, rotation of the second flat screw 80, and heating of the screw heater 89. Further, the material melted in this way is ejected from the nozzle hole 62 and then cured by a decrease in temperature.

It is preferable for the thermoplastic material to be injected from the nozzle hole 62 in a state where the material is heated to a temperature higher than or equal to a glass transition point and is completely melted. For example, it is preferable that a glass transition point of an ABS resin is substantially 120° C. and is substantially 200° C. when being injected from the nozzle hole 62. In order to inject the molten material in such a high temperature state, a heater may be provided around the nozzle hole 62. The "completely melted state" means a state in which there is no unmelted thermoplastic material, and means a state in which no pellet-shaped solid remains, for example, when a pellet-shaped thermoplastic resin is used as a material.

In the modeling unit 200, for example, the following metal material may be used as the main material instead of the thermoplastic material described above. In this case, it is preferable that a powder material obtained by powdering the following metal material is mixed with a component that is melted when the molten material is generated to be input to the plasticizing portion 30.

Example of Metal Material

Magnesium (Mg), iron (Fe), cobalt (Co), chromium (Cr), aluminum (Al), titanium (Ti), copper (Cu), nickel (Ni) single metal, or an alloy containing one or more metals Example of Alloy Maraging steel, stainless steel, cobalt chromium molybdenum, titanium alloy, nickel alloy, aluminum alloy, cobalt alloy, cobalt chromium alloy In the modeling unit 200, a ceramic material instead of the metal material can be used as the main material. For example, oxide ceramics such as silicon dioxide, titanium dioxide, aluminum oxide, and zirconium oxide, non-oxide ceramic such as aluminum nitride, or the like can be used as the ceramic material. When the metal material or ceramic material described above is used as the main material, the molten material disposed on the stage 300 may be cured by, for example, laser irradiation or sintering with hot air.

A powder material such as a metal material or a ceramic material to be input into the first material supply portion 20 or the second material supply portion 25 may be a material a mixture in which a plurality of types of single metal powder, alloy powder, and ceramic material powder are mixed. Further, the powder material of a metal material or a ceramic material may be coated with, for example, a thermoplastic resin exemplified above or other thermoplastic resins. In this case, the plasticizing portion 30 may melt the thermoplastic resin, and thereby, fluidity is exhibited.

For example, the following solvent may be added to the powder material of the metal material or the ceramic material that is input to the first material supply portion 20 or the second material supply portion 25. The solvent can be used by combining one type, two types or more types selected from the following.

Example of Solvent

Water; (poly) alkylene glycol monoalkyl ethers such as ethylene glycol monomethyl ether, ethylene glycol monoethyl ether, propylene glycol monomethyl ether, and propylene glycol monoethyl ether; acetic esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetylacetone; alcohols such as ethanol, propanol, and butanol; tetraalkylammonium acetates; sulfoxide solvents such as dimethyl sulfoxide and diethyl sulfoxide; pyridine solvents such as pyridine, γ-picoline, and 2,6-lutidine; tetraalkylammonium acetate (for example, tetrabutylammonium acetate); ionic liquids such as butyl carbitol acetate, and the like In addition to this, for example, the following binders can be added to the powder material of the metal material or the ceramic material that is input to the first material supply portion 20 or the second material supply portion 25.

Example of Binder

Figure 9:
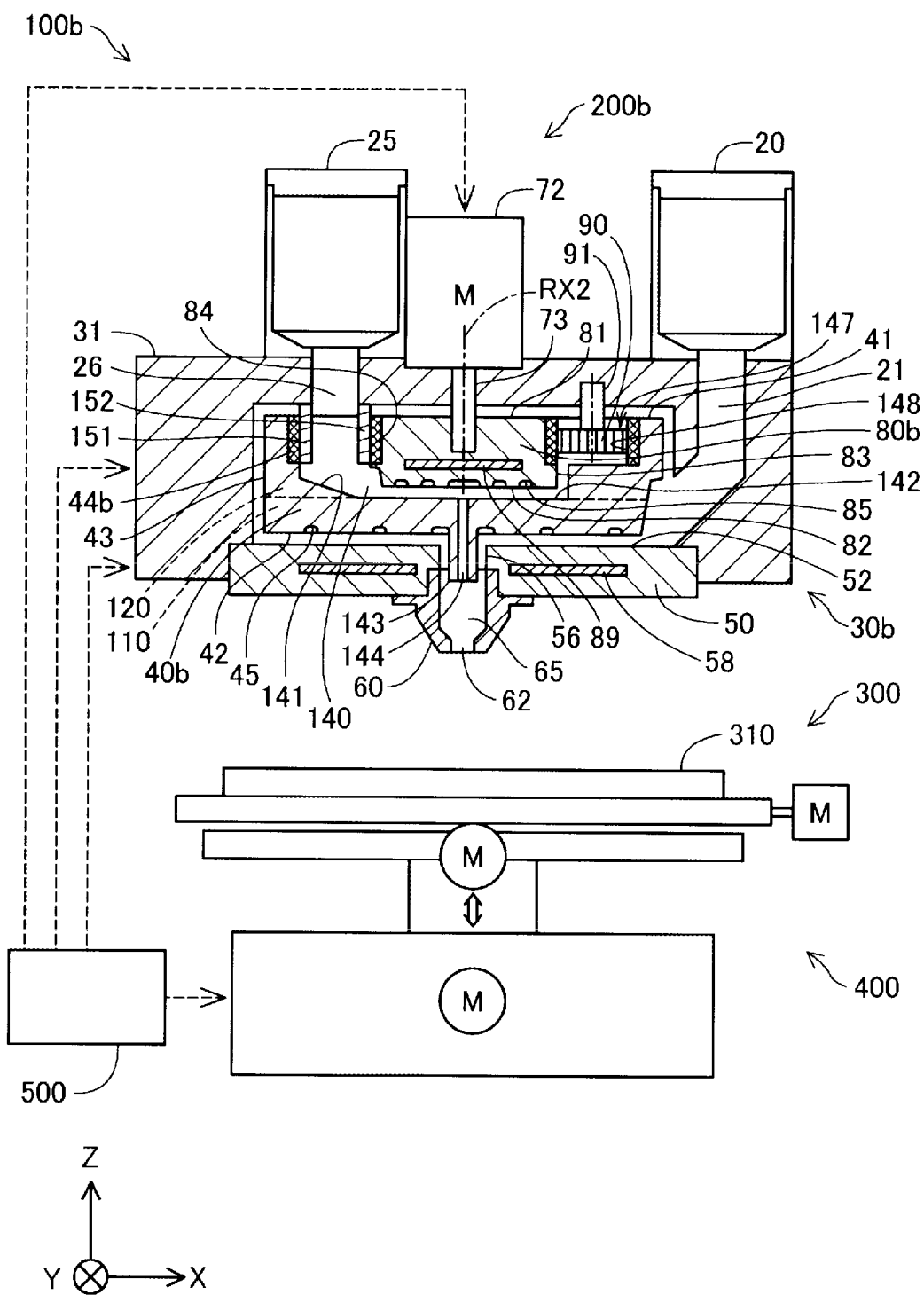
FIG. 9 is an explanatory diagram illustrating a schematic configuration of a three-dimensional modeling apparatus according to a second embodiment.

Acrylic resin, epoxy resin, silicone resin, cellulosic resin, or other synthetic resins, or polylactic acid (PLA), polyamide (PA), polyphenylene sulfide (PPS), polyetheretherketone (PEEK) or other thermoplastic resins B. Second Embodiment FIG. 9 is an explanatory diagram illustrating a schematic configuration of a three-dimensional modeling apparatus 100b according to a second embodiment. A first flat screw 40b in FIG. 9 represents the first flat screw 40b taken along line IX-IX in FIG. 10 which will be described below. In the three-dimensional modeling apparatus 100b according to the second embodiment, a configuration of a plasticizing portion 30b included in a modeling unit 200b is different from the modeling unit of the first embodiment. More specifically, the second embodiment is different from the first embodiment in that the plasticizing portion 30b is not provided with the first drive motor 32 and the gear 34, and a planetary gear 90 for transferring rotation of a second flat screw 80b to the first flat screw 40b is provided. Other configurations are the same as the configurations of the first embodiment illustrated in FIG. 1 as long as there is no description in particular.

The first flat screw 40b includes a stepped portion 147 that contains the planetary gear 90. The stepped portion 147 is a recessed portion provided on an inner peripheral side of an upper surface 41 of the first flat screw 40b. The stepped portion 147 is provided over the entire circumference of the first flat screw 40b. In the present embodiment, a first teeth portion 44b is provided not on an outer peripheral surface 43 of the first flat screw 40b but on an inner peripheral surface 148 of the stepped portion 147.

The second flat screw 80 b includes the second teeth portion 84 on the side surface 83. The second teeth portion 84 is a portion where a plurality of teeth are provided in a peripheral direction of the cylindrical second flat screw 80b. The second teeth portion 84 is provided over the entire circumference of the side surface 83 in the second flat screw 80b.

The planetary gear 90 is provided between the first flat screw 40b and the second flat screw 80b. The planetary gear 90 is supported by a shaft portion 91 and rotates about the shaft portion 91. The shaft portion 91 is fixed to the screw case 31. In the present embodiment, two planetary gears 90 are provided between the first flat screw 40b and the second flat screw 80b. Each planetary gear 90 meshes with the first teeth portion 44b of the first flat screw 40b. Each planetary gear 90 meshes with the second teeth portion 84 of the second flat screw 80b.

If one of the first flat screw 40b and the second flat screw 80b rotates about the rotation axis RX2, one rotation is transferred to the other via the planetary gear 90, and both the first flat screw 40b and the second flat screw 80b rotates about the rotation axis RX2. At this time, a rotation direction of the first flat screw 40b is opposite to rotation directions of the planetary gear 90 and the second flat screw 80b. That is, the first flat screw 40b, the second flat screw 80b, and the planetary gear 90 have a function as a planetary gear mechanism. The second flat screw 80b functions as a sun gear in a planetary gear mechanism, and the first flat screw 40b functions as an internal gear in the planetary gear mechanism. The number of planetary gears 90 provided between the first flat screw 40b and the second flat screw 80b may be one or may be three or more. The second drive motor 72, the first teeth portion 44b, the second teeth portion 84, and the planetary gear 90 may be referred to as a drive unit.

Figure 10:
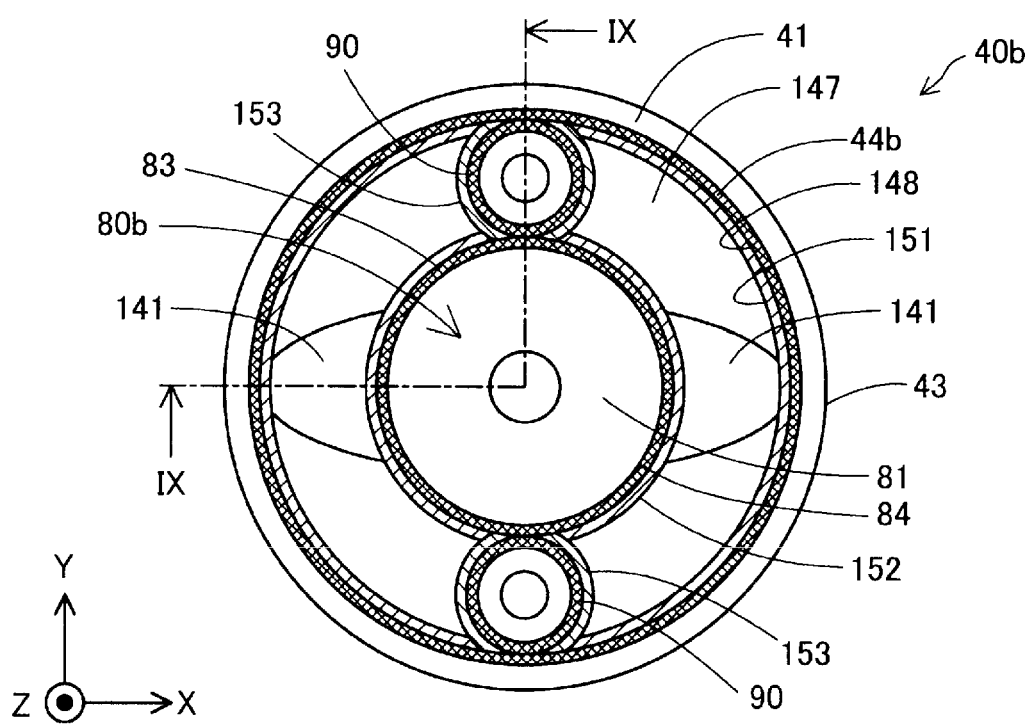
FIG. 10 is a top view illustrating configurations of antifouling plates according to the second embodiment.

FIG. 10 is a top view illustrating configurations of antifouling plates 151 to 153 according to the present embodiment. The first antifouling plate 151 is provided so as to cover the first teeth portion 44b of the first flat screw 40b. The first antifouling plate 151 is a plate-shaped member for suppressing foreign matter from adhering to the first teeth portion 44b. The first antifouling plate 151 is provided so as not to hinder a contact between the first teeth portion 44b and the planetary gear 90.

The second antifouling plate 152 is provided so as to cover the second teeth portion 84 of the second flat screw 80b. The second antifouling plate 152 is a plate-shaped member for suppressing foreign matter from adhering to the second teeth portion 84. The second antifouling plate 152 is provided so as not to hinder a contact between the second teeth portion 84 and the planetary gear 90.

The third antifouling plate 153 is provided so as to surround an outer circumference of each planetary gear 90. The third antifouling plate 153 is a plate-shaped member for suppressing foreign matter from adhering to the planetary gear 90. The third antifouling plate 153 is provided so as not to hinder the contact between the first teeth portion 44b and the planetary gear 90 and is provided so as not to hinder the contact between the second teeth portion 84 and the planetary gear 90.

According to the three-dimensional modeling apparatus 100b including the plasticizing portion 30b of the present embodiment described above, the control unit 500 controls the second drive motor 72, and thereby, the angular velocity vector Ωb1 with respect to the barrel 50 of the first flat screw 40b and the angular velocity vector Ωb2 of the second flat screw 80b with respect to the barrel 50 can be made different to rotate the first flat screw 40b and the second flat screw 80b about the rotation axis RX2. Accordingly, the first material can be plasticized by a relative rotation between the first flat screw 40b and the barrel 50, and the second material can be plasticized by a relative rotation between the second flat screw 80b and the first flat screw 40b contained in the recessed portion 140 of the first flat screw 40b. Particularly, since the angular velocity vector Ωb1 with respect to the barrel 50 of the first flat screw 40b and the angular velocity vector Ωb2 with respect to the barrel 50 of the second flat screw 80b can be made different even without using a plurality of drive motors, the plasticizing portion 30b can be miniaturized more than a form using the plurality of drive motors.

Further, in the present embodiment, the antifouling plates 151 to 153 are provided, and thus, it is possible to suppress rotations of the first flat screw 40b and the second flat screw 80b from being hindered due to foreign matter caught between the planetary gear 90 and the first teeth portion 44b, or between the planetary gear 90 and the second teeth portion 84.

C. Third Embodiment

Figure 11:
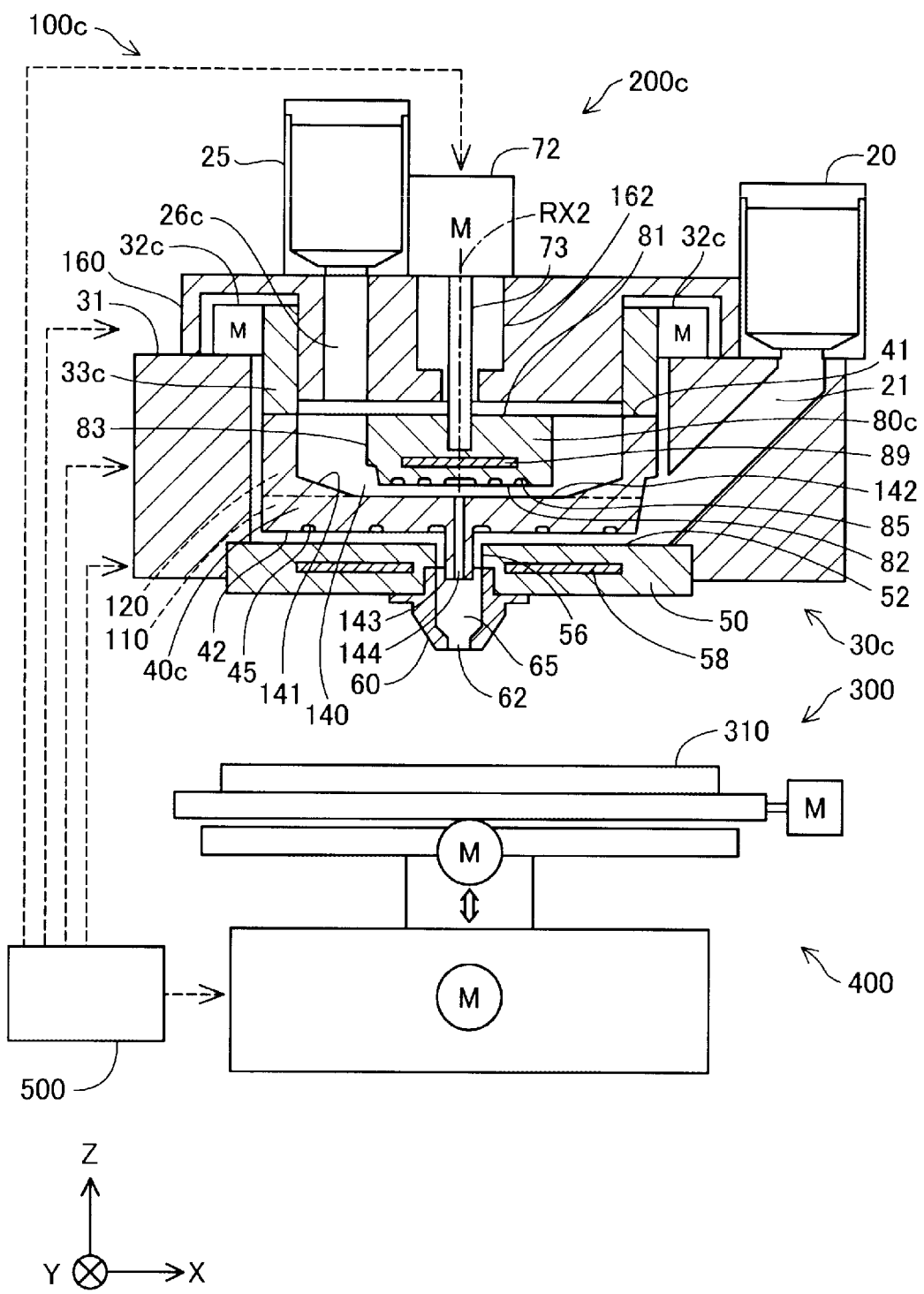
FIG. 11 is an explanatory diagram illustrating a schematic configuration of a three-dimensional modeling apparatus according to a third embodiment.

FIG. 11 is an explanatory diagram illustrating a schematic configuration of a three-dimensional modeling apparatus 100c according to a third embodiment. In the three-dimensional modeling apparatus 100c according to the third embodiment, a configuration of a plasticizing portion 30c included in the modeling unit 200c is different from the configuration of the first embodiment. More specifically, the third embodiment is different from the first embodiment in that a first drive motor 32c provided in the plasticizing portion 30b is configured by a hollow motor. Other configurations are the same as the configurations of the first embodiment illustrated in FIG. 1 as long as there is no description in particular. The first drive motor 32c and the second drive motor 72 may be referred to as a drive unit.

As described above, the first drive motor 32c is configured by a hollow motor. The hollow motor means a motor whose rotation center is configured in a hollow. The first drive motor 32c includes a tubular first shaft 33c. A main body portion of the first drive motor 32c is provided in an outer circumference of the first shaft 33c. The main body portion of the first drive motor 32c is fixed to an upper surface of the screw case 31. The first shaft 33c is fixed to an upper surface 41 of a first flat screw 40c.

A screw support portion 160 is provided inside the first shaft 33c of the first drive motor 32c. Since the screw support portion 160 is fixed to the screw case 31, the screw support portion 160 does not rotate for the first shaft 33c. The second drive motor 72 is fixed to an upper surface of the screw support portion 160. The second shaft 73 of the second drive motor 72 is provided so as to penetrate the screw support portion 160. The screw support portion 160 may be in contact with the first shaft 33c via a bearing or a roller. The screw support portion 160 may be in contact with the second shaft 73 through a bearing or a roller.

The second material supply portion 25 is provided in the screw support portion 160. A second supply path 26c is provided so as to penetrate the screw support portion 160.

The screw support portion 160 is provided with a heat dissipation hole 162, and the second shaft 73 of the second drive motor 72 passes through the heat dissipation hole 162. The heat dissipation hole 162 is a hole for promoting heat dissipation of the second shaft 73. By providing the heat dissipation holes 162 in the screw support portion 160, it is possible to suppress heat from being transferred to a main body portion of the second drive motor 72 and a main body portion of the first drive motor 32c via the second shaft 73. In order to cool the screw support portion 160, a coolant flow path through which a coolant flows may be provided inside the screw support portion 160. The screw support portion 160 is preferably formed of a material with high thermal conductivity, such as an aluminum alloy or copper.

According to the three-dimensional modeling apparatus 100c including the plasticizing portion 30c of the present embodiment described above, by controlling the first drive motor 32c and the second drive motor 72 by using the control unit 500, the angular velocity vector Ωb1 with respect to the barrel 50 of the first flat screw 40c is made different from the angular velocity vector Ωb2 with respect to the barrel 50 of the second flat screw 80c, and thereby, the first flat screw 40c and the second flat screw 80c can rotate about the rotation axis RX2. Accordingly, the first material can be plasticized by a relative rotation between the first flat screw 40c and the barrel 50, and the second material can be plasticized by a relative rotation between the second flat screw 80c contained in the recessed portion 140 of the first flat screw 40c and the first flat screw 40c. Particularly, in the present embodiment, since a gear or the like for rotating the first flat screw 40c or the second flat screw 80c is not provided in the recessed portion 140 of the first flat screw 40c, it is possible to suppress rotations of the first flat screw 40c and the second flat screw 80c from being hindered due to foreign matter caught in the gear or the like. Further, since a rotation center of the first shaft 33c of the first drive motor 32c and a rotation center of the second shaft 73 of the second drive motor 72 can both be provided on the rotation axis RX2, the plasticizing portion 30c in the horizontal direction can be miniaturized.

Figure 12:
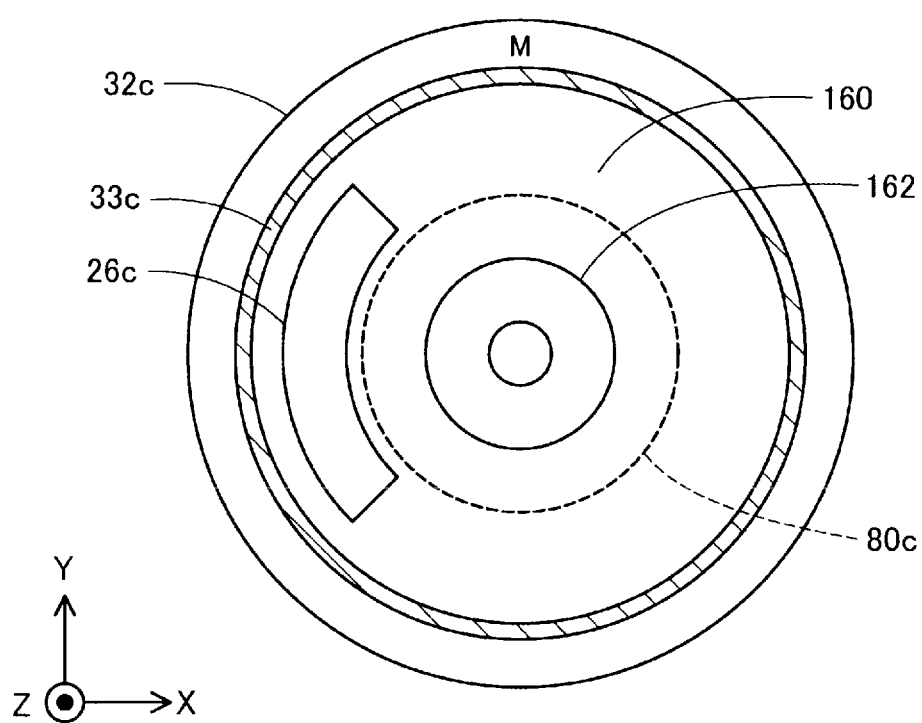
FIG. 12 is a top view illustrating a configuration of a screw support portion according to another form.

D. Other Embodiments (D1) FIG. 12 is a top view illustrating the screw support portion 160 as another form. In the three-dimensional modeling apparatus 100c according to the third embodiment described above, the screw support portion 160 is fixed to the screw case 31. In contrast to this, the screw support portion 160 is not fixed to the screw case 31 and may be fixed to the first shaft 33c of the first drive motor 32c and rotate together with the first shaft 33c as illustrated in FIG. 12. Even in this case, by controlling the first drive motor 32c and the second drive motor 72 by using the control unit 500, the first material can be plasticized by a relative rotation between the first flat screw 40c and the barrel 50, and the second material can be plasticized by a relative rotation between the second flat screw 80c contained in the recessed portion 140 of the first flat screw 40c and the first flat screw 40c. When the screw support portion 160 rotates together with the first shaft 33c, the second material supply portion 25 is preferably fixed to the screw case 31. In this case, a shape of an opening of the second supply path 26c over an upper surface of the screw support portion 160 is preferably, for example, a fan shape as illustrated in FIG. 12. By forming the shape of the opening of the second supply path 26c in a fan shape, a period when an opening provided on a bottom surface of the second material supply portion 25 overlaps an opening of the second supply path 26c can be lengthened during the rotation of the screw support portion 160, and thereby, the second material can be smoothly supplied from the second material supply portion 25 to the second supply path 26c.

(D2) In the three-dimensional modeling apparatus 100, 100b, and 100c according to each embodiment described above, a heater may be built in the first flat screws 40, 40b, and 40c. In this case, since a first material supplied to the first groove portion 45 and a second material supplied to the second groove portion 85 can be heated by the heater, plasticization of the first material in the first groove portion 45 and plasticization of the second material in the second groove portion 85 can be promoted. The heater may be referred to as a third heating unit.

(D3) In the three-dimensional modeling apparatuses 100, 100b, and 100c according to each embodiment described above, the barrel heater 58 is built in the barrel 50, and the screw heater 89 is built in the second flat screws 80, 80b, and 80c. In contrast to this, either the barrel heater 58 or the screw heater 89 may not be provided, and both the barrel heater 58 and the screw heater 89 may not be provided.

(D4) In the three-dimensional modeling apparatuses 100, 100b, and 100c according to each embodiment described above, the protruding portion 143 may not be provided in the first flat screws 40, 40b, and 40c, and the second through-hole 144 may penetrate between the second facing surface 142 and the first central portion 46.

(D5) In the three-dimensional modeling apparatus 100b according to the second embodiment described above, the plasticizing portion 30b may be provided with at least one of the first antifouling plate 151, the second antifouling plate 152, and the third antifouling plate 153.

(D6) In the three-dimensional modeling apparatus 100 according to the first embodiment described above, the gear 34 provided on the first shaft 33 of the first drive motor 32 may not be in contact with the first teeth portion 44 of the first flat screw 40, for example, a belt or a chain may be laid around the gear 34 and the first teeth portion 44. In this case, torque generated by the first drive motor 32 can be transferred to the first flat screw 40 by the belt or the chain.

(D7) In the three-dimensional modeling apparatus 100b according to the second embodiment described above, the plasticizing portion 30b includes the second drive motor 72 that rotates the second flat screw 80b. In contrast to this, the plasticizing portion 30b may not include the second drive motor 72 that rotates the second flat screw 80b and may include the first drive motor 32 and the gear 34 that are the same as in the first embodiment, and the first teeth portion 44 may be provided in the outer peripheral surface 43 of the flat screw 40b. In this case, the control unit 500 controls the first drive motor 32 to enable the barrel 50 and the first flat screw 40b relatively rotate and enable the first flat screw 40b and the second flat screw 80b to relatively rotate.

(D8) In the three-dimensional modeling apparatuses 100 and 100c according to the first embodiment and the third embodiment described above, the control unit 500 controls the first drive motors 32 and 32c and the second drive motor 72, thereby, rotating the first flat screws 40 and 40c and the second flat screw 80 and 80c in a reverse rotation direction. In contrast to this, the control unit 500 controls the first drive motors 32 and 32c and the second drive motor 72 to rotate the first flat screws 40 and 40c and the second flat screws 80 and 80c in the same rotation direction and at different rotation speeds. Even in this case, the first material can be plasticized by a relative rotation between the first flat screws 40 and 40c and the barrel 50, and the second material can be plasticized by a relative rotation between the second flat screws 80 and 80c and the first flat screws 40 and 40c.

(D9) In the three-dimensional modeling apparatus 100, 100b, and 100c according to each embodiment described above, a second nozzle different from the nozzle 60 may be provided. For example, the first through-hole 56 may communicate with the nozzle 60, and the second through-hole 144 may communicate with the second nozzle. In this case, the first molten material sent out from the first through-hole 56 can be ejected from the nozzle 60, and the second molten material sent out from the second through-hole 144 can be ejected from the second nozzle.

(D10) In the three-dimensional modeling apparatuses 100, 100*b*, and 100*c* according to each embodiment described above, a diameter of the base portion 110 of the first flat screws 40, 40*b*, and 40*c* is equal to a diameter of the side wall portion 120. In contrast to this, the diameter of the base portion 110 may be larger than the diameter of the side wall portion 120. That is, the first flat screw 40, 40*b*, and 40*c* may have a configuration in which the base portion 110 protrudes outward more than the side wall portion 120.

(D11) In the three-dimensional modeling apparatuses 100, 100*b*, and 100*c* according to each embodiment described above, ABS resin is used as the first material and polypropylene resin (PP) is used as the second material. That is, a resin material is used for the first material and the second material. In contrast to this, a material containing a metal material or a ceramic material may be used as at least one of the first material and the second material.

(D12) The plasticizing portions 30, 30*b*, and 30*c* according to each embodiment described above may be used for an injection molding apparatus instead of the three-dimensional modeling apparatuses 100, 100*b*, and 100*c*.

E. Other Forms

The present disclosure is not limited to the above-described embodiments and can be realized in various forms without departing from the spirit of the present disclosure. For example, the present disclosure can be realized by the following forms. The technical characteristics of the above-described embodiments corresponding to the technical characteristics of each embodiment which will be described below can be replaced or combined appropriately in order to solve a part or all of the problems of the present disclosure, or to achieve a part or all of the effects of the present disclosure. Further, if the technical characteristics are not described as essential in the present specification, the technical characteristics can be removed as appropriate.

(1) According to the first embodiment of the present disclosure, there is provided a plasticizing apparatus that plasticizes a material into a molten material. The plasticizing apparatus includes a barrel that is provided with a first through-hole along a first axis, a first screw in which a first groove portion having a spiral shape is provided in a surface facing a barrel about a first axis, a side wall having a cylindrical shape is provided along an outer peripheral edge of a surface facing a side opposite to the barrel, and a second through-hole is provided along the first axis, a second screw in which at least a part of the second screw is disposed inside the side wall and a second groove portion having a spiral shape is provided in a surface facing the barrel about the first axis with the first screw therebetween, and a drive unit that rotate the first screw and the second screw about the first axis by making angular velocity vectors thereof different from each other with respect to the barrel. The first screw generates first molten material by plasticizing a first material supplied to the first groove portion by a relative rotation with the barrel and sends out the first molten material from the first through-hole, and the second screw generates a second molten material by plasticizing a second material supplied to the second groove portion by a relative rotation with the first screw and sends out the second molten material to the second through-hole.

According to the plasticizing apparatus of the aspect, a first material can be plasticized by a relative rotation between a first screw and a barrel, and a second material can be plasticized by a relative rotation between a second screw disposed inside a side wall of the first screw and the first screw. Accordingly, different kinds of materials can be plasticized at once by a small apparatus.

(2) In the plasticizing apparatus according to the above-described aspect, the drive unit may include a drive motor that rotates either the first screw or the second screw, a first teeth portion that is provided an inner peripheral surface of the side wall of the first screw, a second teeth portion that is provided on an outer peripheral surface of the second screw, and a planetary gear that meshes with the first teeth portion and the second teeth portion.

According to the plasticizing apparatus of the aspect, an angular velocity vector with respect to a barrel of a first screw and an angular velocity vector with respect to the barrel of a second screw can be made different without using a plurality of drive motors, and thus, the apparatus can be miniaturized more than before.

(3) In the plasticizing apparatus according to the above-described aspect, an antifouling plate for suppressing foreign matter from being caught between the planetary gear and the first teeth portion and between the planetary gear and the second teeth portion may be provided to surround at least a part of an outer circumference of the planetary gear.

According to the plasticizing apparatus of the aspect, foreign matter can be suppressed from being caught between a planetary gear and a first teeth portion and between the planetary gear and a second teeth portion, and thus, it is possible to suppress rotation of a first screw and rotation of a second screw from being hindered due to catching of the foreign matter.

(4) In the plasticizing apparatus according to the above-described aspect, a first heating unit may be provided in the barrel.

According to the plasticizing apparatus of the aspect, a first material supplied to a first groove portion can be heated by a first heating unit, and thus, plasticization of the first material in the first groove portion can be promoted.

(5) In the plasticizing apparatus according to the above-described aspect, a second heating unit may be provided in the second screw.

According to the plasticizing apparatus of the aspect, a second material supplied to a second groove portion can be heated by a second heating unit, and thus, plasticization of the second material in the second groove portion can be promoted.

(6) In the plasticizing apparatus according to the above-described aspect, a third heating unit may be provided in the first screw.

According to the plasticizing apparatus of the aspect, a first material supplied to a first groove portion and a second material supplied to a second groove portion can be heated by a third heating unit, and thus, plasticization of the first material in the first groove portion and plasticization of the second material in the second groove portion can be promoted.

(7) In the plasticizing apparatus according to the above-described aspect, when the first screw and the barrel are viewed along the first axis, an opening on the barrel side of the second through-hole provided in the first screw may be located inside an opening on the first screw side of the first through-hole provided in the barrel.

According to the plasticizing apparatus of the aspect, a first molten material and a second molten material can be sent out from a first through-hole in a state where an outer peripheral surface of the second molten material is covered with the first molten material.

(8) In the plasticizing apparatus according to the above-described aspect, the first screw may include a protruding portion that extends along the first axis into the first through-hole of the barrel, and the second through-hole of the first screw may penetrate to a front end of the protruding portion.

According to the plasticizing apparatus of the aspect, it is possible to suppress a second molten material sent out from the second through-hole from flowing out between a first screw and a barrel.

(9) According to a second embodiment of the present disclosure, there is provided a three-dimensional modeling apparatus. The three-dimensional modeling apparatus includes the plasticizing apparatus according to the first aspect of the present disclosure, a control unit that controls a drive unit of the plasticizing apparatus, and a nozzle that ejects a molten material supplied from the plasticizing apparatus toward a stage.

According to the three-dimensional modeling apparatus of the aspect, a first material can be plasticized by a relative rotation between a first screw and a barrel, and a second material can be plasticize by a relative rotation between a second screw disposed inside a side wall of the first screw and the first screw. Accordingly, different types of materials can be plasticized at once and ejected from a nozzle by a small apparatus.

(10) In the three-dimensional modeling apparatus according to the above-described aspect, the drive unit may include a first drive motor that rotates the first screw and a second drive motor that rotates the second screw, and the control unit may control the first drive motor and the second drive motor to make a direction of an angular velocity vector of the first screw with respect to the barrel different from a direction of an angular velocity vector of the second screw with respect to the first screw.

According to the three-dimensional modeling apparatus of the aspect, a relative rotation of a first screw and a second screw is easier to increase than an aspect in which a direction of an angular velocity vector of the first screw with respect to a barrel is the same as a direction of an angular velocity vector of the second screw with respect to the first screw, and thus, a second material can be plasticized more effectively.

(11) In the three-dimensional modeling apparatus according to the above-described aspect, the control unit may control the first drive motor and the second drive motor to make the direction of the angular velocity vector of the first screw with respect to the barrel different from a direction of an angular velocity vector of the second screw with respect to the barrel.

According to the three-dimensional modeling apparatus of the aspect, a relative rotation of a first screw and a second screw is easier to increase than an aspect in which a direction of an angular velocity vector of the first screw with respect to a barrel is the same as a direction of an angular velocity vector of the second screw with respect to the barrel, and thus, a second material can be plasticized more effectively.

The present disclosure can be realized in various forms other than a plasticizing apparatus. For example, the disclosure can be realized in the form of a three-dimensional modeling apparatus, an injection molding apparatus, or the like.

What is claimed is:

1. A plasticizing apparatus that plasticizes a material into a molten material, the apparatus comprising:
    a barrel that is provided with a first through-hole along a first axis;
    a first screw in which a first groove portion having a spiral shape about the first axis is provided in a surface facing the barrel, a side wall having a cylindrical shape is provided along an outer peripheral edge of a surface facing a side opposite to the barrel, and a second through-hole is provided along the first axis;
    a second screw of which at least apart is disposed inside the side wall and in which a second groove portion having a spiral shape about the first axis is provided in the surface facing the barrel with the first screw interposed therebetween; and
    a drive unit that rotates the first screw and the second screw about the first axis by making angular velocity vectors thereof different from each other with respect to the barrel, wherein
    the first screw generates first molten material by plasticizing a first material supplied to the first groove portion by a relative rotation with the barrel and sends out the first molten material from the first through-hole, and
    the second screw generates a second molten material by plasticizing a second material supplied to the second groove portion by a relative rotation with the first screw and sends out the second molten material to the second through-hole.

2. The plasticizing apparatus according to claim 1, wherein
    the drive unit includes
        a drive motor that rotates either the first screw or the second screw;
        a first teeth portion that is provided on an inner circumferential surface of the side wall of the first screw;
        a second teeth portion that is provided on an outer circumferential surface of the second screw; and
        a planetary gear that meshes with the first teeth portion and the second teeth portion.

3. The plasticizing apparatus according to claim 2, wherein
    an antifouling plate for suppressing foreign matter from being caught between the planetary gear and the first teeth portion and between the planetary gear and the second teeth portion is provided to surround at least a part of an outer circumference of the planetary gear.

4. The plasticizing apparatus according to claim 1, wherein
    a first heating unit is provided in the barrel.

5. The plasticizing apparatus according to claim 1, wherein
    a second heating unit is provided in the second screw.

6. The plasticizing apparatus according to claim 1, wherein
    a third heating unit is provided in the first screw.

7. The plasticizing apparatus according to claim 1, wherein
    when the first screw and the barrel are viewed along the first axis, an opening on a barrel side of the second through-hole provided in the first screw is located inside an opening on a first screw side of the first through-hole provided in the barrel.

8. The plasticizing apparatus according to claim 1, wherein
    the first screw includes a protruding portion that extends along the first axis into the first through-hole of the barrel, and
    the second through-hole of the first screw penetrates to a front end of the protruding portion.

9. A three-dimensional modeling apparatus, comprising:
    the plasticizing apparatus of claim 1;
    a control unit that controls the drive unit of the plasticizing apparatus; and a nozzle that ejects the molten material supplied from the plasticizing apparatus toward a stage.

10. The three-dimensional modeling apparatus according to claim 9, wherein
the drive unit includes a first drive motor that rotates the first screw, and a second drive motor that rotates the second screw, and
the control unit controls the first drive motor and the second drive motor to make a direction of an angular velocity vector of the first screw with respect to the barrel different from a direction of an angular velocity vector of the second screw with respect to the first screw.

11. The three-dimensional modeling apparatus according to claim 10, wherein
the control unit controls the first drive motor and the second drive motor to make the direction of the angular velocity vector of the first screw with respect to the barrel different from the direction of the angular velocity vector of the second screw with respect to the barrel.

* * * * *